Sept. 10, 1963  D. J. SANTELER  3,103,108
SHIELDED THERMAL GRADIENT MEMBER
Filed July 17, 1961

Inventor
Donald J. Santeler
by Paul A. Frank
His Attorney

United States Patent Office 3,103,108
Patented Sept. 10, 1963

3,103,108
SHIELDED THERMAL GRADIENT MEMBER
Donald J. Santeler, Scotia, N.Y., assignor to General Electric Company, a corporation of New York
Filed July 17, 1961, Ser. No. 124,729
8 Claims. (Cl. 62—268)

The present invention relates to shields for thermal gradient members used in cryogenic environments, and more particularly, to refrigerated shields for condensing molecules emitted from thermal gradient members in evacuated chambers.

Gas molecules which strike clean surfaces in evacuated chambers maintained at low pressures are normally adsorbed on the surfaces. After a period of residence on the surface, the molecules may re-evaporate and leave the wall. The residence time on a surface depends to a great extent on the type of gas being condensed, the surface material, and the temperature of the surface. The binding energy holding a molecule to a clean wall may be extremely strong and hence the residence time may be extremely long. As a result, most surfaces in environments of the type described contain almost a complete layer of adsorbed gas, even at extremely low pressures. It is further noted that the binding energy for adsorbing molecules beyond the first layer is much weaker than at the initial layer. As a result, the additional layers beyond the first layer do not form except for gases which are condensible at the temperature of the surface.

Consideration of this particular phenomenon of adsorption and evaporation, dependent upon temperature conditions on a thermal gradient member in an evacuated system, is important for maintaining desired vacuum levels. For example, if the temperature on a surface is sufficiently high, the residence time of molecules is extremely short, in the order of microseconds. For practical purposes, such a residence can be made analogous to the molecules merely bouncing off the wall. At extremely low temperatures, a reverse situation is true, that is, the residence time may be so long that for all practical purposes it may be considered permanent. At intermediate temperatures, the residence time may be for a short period. As an example, the case of water vapor may be considered, especially since water vapor may constitute a substantial portion of the gas molecules remaining in an evacuated system. At room temperatures in a vacuum system, the residence time of the water vapor is quite short. At low temperatures, for example, at liquid nitrogen temperatures (77° K.), the residence time may be considered of sufficient duration as to be construed to be permanent. At intermediate temperatures, intermediate residence times will exist such that harmful long term evaporation will occur, limiting the performance of the vacuum system.

From the above consideration and recognizing that present-day evacuated chambers and similar equipment, such as space simulators, contain wide ranges of temperature and pressure, it will be appreciated that a large number of surfaces are included therein at intermediate temperatures. For example, in utilizing a conventional nitrogen refrigerated trap in an evacuated chamber, it is undesirable to have the refrigerated trap in direct communication with external portions of the chamber at ambient conditions. It is, therefore, necessary to have the refrigerated surfaces remote or shielded from external portions of the chamber. However, it is also appreciated that the chamber must in some way support the trap and suitable barriers may be required in the chamber to perform the function. These connecting elements and barriers will have thermal gradients which promote intermediate residence times for certain gas molecules. As a result of these intermediate temperature conditions within the evacuated chamber, the pumping down of the chamber to a desired low pressure may be extremely difficult.

The chief object of the present invention is to provide an improved cryogenic vacuum chamber construction.

Another object of the invention is to provide a condensing shield mounted adjacent intermediate temperature surfaces located in an evacuated chamber.

A still further object of the invention is to provide an improved condensing shield which extends into the evacuated chamber adjacent intermediate temperature surfaces for the purpose of condensing molecules passing to or being emitted by the intermediate temperature surfaces.

These and other objects of my invention may be more readily perceived from the following description.

One of the features of my invention is a cryogenic apparatus including an evacuated chamber having a wall portion maintained at substantially ambient temperatures and having located adjacent thereto a refrigerated wall and a connecting thermal gradient member. A projecting member may extend from and be thermally connected to the refrigerated wall. The projecting member which is substantially at the temperature of the refrigerated wall may extend adjacent the thermal gradient member in such a manner that molecules passing or being emitted from the thermal gradient member are condensed on the projecting member to maintain the low pressure conditions desired within the evacuated chamber.

The attached drawings illustrate preferred embodiments of the invention, in which.

Figure 1:
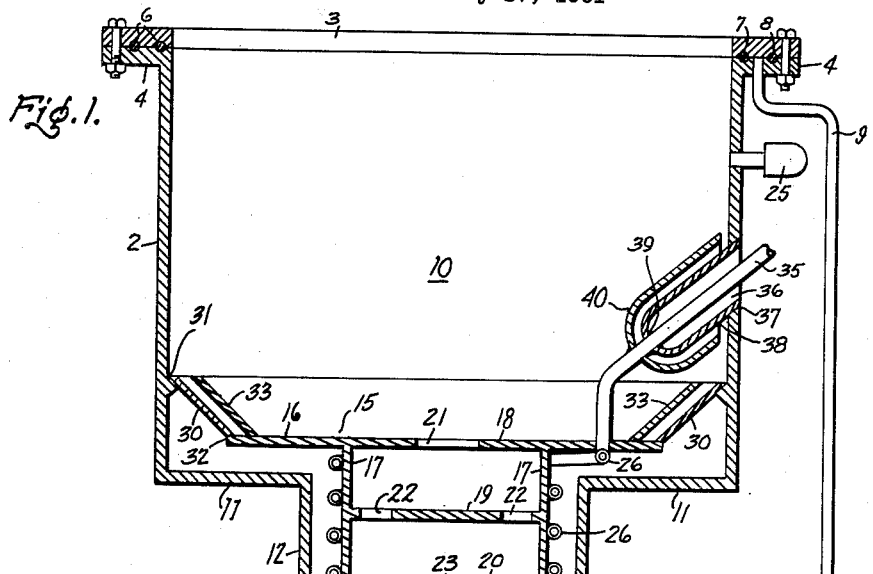
FIGURE 1 is a view, in section, of a vacuum system for practicing the present invention.

In FIGURE 1 there is shown a vacuum system employing the present invention. The vacuum system includes a cylindrical housing 2 having attached thereto end member 3 which may be suitably bolted to flange 4 attached to cylindrical shell 2. Preferably seal means 6 is supplied between flange 4 and end member 3. This seal means may comprise a pair of O-rings 7 and 8 and the annular space between the rings may be connected by line 9 to a suitable rough vacuum pump. Cylindrical shell 2 with end member 3 and bottom member 11 having an annular planar shape substantially define evacuated chamber 10 wherein a suitable test member may be placed. Annular planar member 11 may be connected to cylindrical shell 12 having annular planar member 13 adapted to be connected to diffusion pump 14. This diffusion pump may be of a conventional design and may be connected by means of foreline 27 to rough vacuum pump 28 which is also utilized to main seal means 6.

Shell 12 and annular member 13 substantially define a cavity wherein a suitable trap may be placed for the purpose of isolating diffusion pump fluid and also to pump cryogenically condensible gases in chamber 10.

In the present embodiment, trap 13 may comprise an annular planar member 16 having extending therefrom a cylindrical portion 17 having associated therewith a plurality of baffle members 18, 19, and 20. These baffles may define an optical seal between chamber 10 and diffusion pump 14. Baffle 18 has an opening 21 which is staggered from openings 22 in baffle 19 and similarly opening 23 is staggered from openings 22 in baffle 19. It will be noted that the trap includes coil 26 through which a refrigerant, such as liquid nitrogen, may be circulated to refrigerate the trap.

Shell 2 and member 3 and the other components of the vacuum system are at substantially ambient temperature with the exception of the portions of the nitrogen cooled trap which are at substantially the boiling point of liquid nitrogen (77° K.). Since the trap must be supported in some manner within the chamber, it is apparent that a thermal gradient will exist between one portion of the mounting means and the opposite end which is attached to the trap itself. In the present embodiment, the support of the liquid nitrogen cooled trap is performed by a substantially frusto-conical shape member 30 which supplies the function of supporting the trap in the chamber and also provides a barrier whereby all the molecules in chamber 10 must pass through openings in baffles 18, 19, and 20 to diffusion pump 14. This baffle construction assures the condensation of molecules being pumped and also assures that pumping fluid from the diffusion pump does not pass to chamber 10 without first encountering at least one condensing surface.

From the construction illustrated in FIGURE 1, it can be seen that the thermal gradient barrier 30 at point 31 is at substantially ambient temperature since this section of the thermal gradient barrier is connected to shell 2. At the other end of the frusto-conical member which constitutes the thermal gradient barrier, that is, at point 32, substantially the temperature of liquid nitrogen refrigerant exists.

As previously mentioned, the residence time of gas molecules, such as water vapor at ambient temperature, will be short so that molecules of water vapor and other gases at point 31 are substantially reflected immediately without any appreciable residence time. At the other extreme, that is, in the area adjacent point 32, it may be assumed that water molecules are substantially permanently condensed thereon forming a film of ice. Intermediate points 31 and 32, as previously noted, varying residence times exist. It will be recognized that operating a vacuum system under conditions of condensation and evaporation of molecules that the minimum pressure achieved by the system as measured by ion gage 25 is limited by these unpumped molecules being present.

The present invention envisions minimizing the amount of molecules reaching the thermal gradient barrier and trapping the molecules which re-evaporate from the thermal gradient barrier, assuring that they are immediately condensed for a substantial length of time; preferably in the manner of the molecules condensed at point 32 which may be for practical purposes considered having permanent residence. In order to practice the present invention in the apparatus in FIGURE 1, there is utilized an annular baffle or projecting member 33 which lies adjacent the thermal gradient barrier and is thermally connected to annular plate member 16 which constitutes a portion of trap 15. Since plate 16 is at substantially the temperature of liquid nitrogen, member 33 thermally connected thereto is at substantially the same temperature. Molecules released or emitted from thermal gradient barrier 30 from the surface thereof in communication with chamber 10 are substantially directed toward this cool projecting member 33 and are condensed thereon.

A similar thermal gradient problem arises in introducing liquid nitrogen into coil 26. In FIGURE 1 it is noted that refrigerant is introduced through a filler pipe 35 which extends through opening 36 in shell 2. Opening 36 is substantially defined by the peripheral edge 37 in shell 2. In order to seal the opening and maintain the evacuated chamber 10, in this embodiment a substantially cup shape member 38 having cylindrical walls is provided. This member is attached at edge 37 to shell 2 and is connected at area 39 to filler pipe 35 to form a seal therebetween. This construction defines a thermal gradient across member 38. In this embodiment, a suitable projecting member 40 lying adjacent member 38 and having a substantially cup shape is thermally connected to filler pipe 35. Member 40 therefore has substantially the same temperature as the filler tube and thereby shields the cup shape member 38 to minimize molecules reaching member 38 and to condense molecules being emitted from the surface of the thermal gradient barrier.

Figure 2:
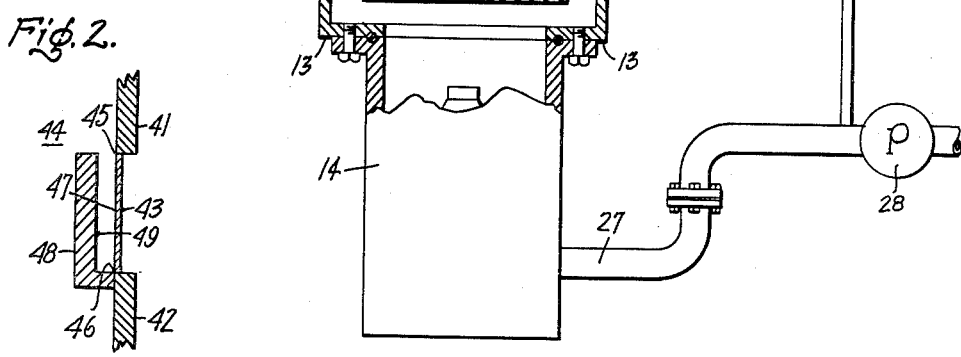
FIGURE 2 is a fragmentary sectional view of a preferred construction for practicing the present invention.

In FIGURE 2 there is illustrated a fragmentary view of another embodiment of the invention. There is shown a wall member 41 which is maintained at substantially ambient conditions. Located adjacent wall 41 is a cryogenically cooled wall 42 connected to ambient temperature wall 41 by connecting wall 43 which constitutes a thermal gradient member. At point 45, the thermal gradient member has substantially the temperature of wall 41 and at point 46 the temperature of thermal gradient member 43 is at the refrigerated temperature of wall 42. At point 47, it is readily apparent that an intermediate temperature exists and under operating conditions wherein a vacuum or other low pressure condition exists on side 44, there is a tendency for molecules to have an undesirable residence time on portions of the surface of connecting wall 43 adjacent area 47. Molecules may remain for varying periods of time, minutes, hours, or days on the surface and a continuous process of condensation and evaporation may occur thereby maintaining an undesirable high level of pressure within the associated chamber on the evacuated side 44. As previously noted, it is desirable that gases such as water vapor which may have this intermediate residence time be suitably condensed and for this purpose, the present embodiment provides a projecting L-shape member 48 having an inner surface 49 lying adjacent the thermal gradient member. As previously noted, this projecting member 48 is in heat exchange relationship with wall 42 which is maintained at cryogenic temperatures. Surface 49 is at sufficiently low temperature so that molecules being emitted from the area 47 on the thermal gradient member are immediately condensed on the surface of the projecting member. The permanent residence so provided permits low pressures to be achieved in the evacuated chamber.

Figure 3:
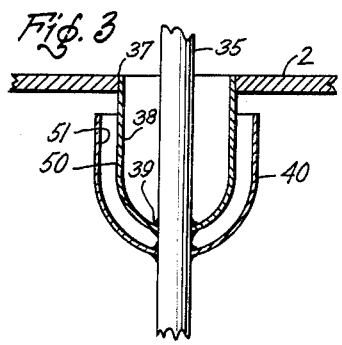
FIGURE 3 is a sectional view of the refrigerant inlet shown in FIGURE 1.

In FIGURE 3 there is shown an enlarged view of the refrigerant filler arrangement shown in FIGURE 1. It is noted in this view that at edge 37 the ambient temperature of shell 2 may exist while at filler pipe 35 or at junction area 39 where the thermal gradient barrier 38 is thermally connected to filler pipe 35, the temperature of the refrigerant substantially will exist. Intermediate these points there is a large variation of temperature so that molecules residing or being condensed at area 50 have an undesirable intermediate residence time which may harmfully affect the operation of evacuated chamber 10 shown in FIGURE 1. In order to avoid such harmful condensation and consequent evaporation, a suitable projecting member having the general cup shape in the form of member 40 is thermally attached to filler tube 35 and spaced adjacent and substantially parallel to the surface of thermal gradient barrier 38. In this manner molecules emitted from barrier 38 substantially are assured of encountering the refrigerated surface 51 and being condensed thereon because of its low temperature. Also molecules passing toward the thermal gradient may be condensed. Accordingly, it can be seen that molecules in the area of the thermal gradient barrier are substantially condensed without harmfully affecting the character of the vacuum being maintained in chamber 10.

Figure 4:
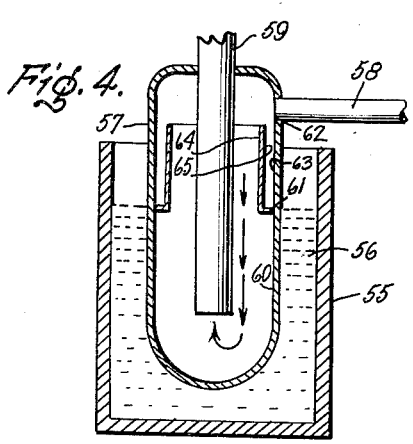
FIGURE 4 is a sectional view of a refrigerant cooled trap employing the present invention.

In FIGURE 4 there is shown another embodiment of the invention utilized in a cryogenic trap. In this embodiment, container 55 is supplied with liquid nitrogen 56 providing a bath for vessel 57 having an entrance passage 58 connected to a chamber to be evacuated. Extending into the upper portion of vessel 57 is a discharge passage 59 which terminates adjacent the bottom portion of vessel 57. The vessel substantially forms a jacket around the discharge passage. Since the lower portion of vessel 57 is substantially refrigerated by the liquid nitrogen, the passage of certain gas molecules in the trap will cause their condensation on the inside of the lower portion of the vessel because of the low temperature. The portion of vessel 57 above the refrigerant level may be at a higher temperature. A temperature gradient, therefore, exists between the inlet passage 58 and the area adjacent the refrigerant level. Accordingly, it can be seen that at point 62 ambient temperature may exist and at point 61 the liquid nitrogen temperature may exist. Intermediate portion 63 may constitute a thermal gradient from which harmful evaporation of condensed gases may occur. Accordingly, the present invention supplies a projecting member 64, the lower portion of which is attached to the inner surface 60 of the vessel in an area in heat exchange relation with liquid nitrogen 56 so that the entire projecting member 64 is at substantially the temperature of the liquid refrigerant. Molecules emitted from the intermediate temperature surface 63 immediately encounter surface 65 of projecting member 64 and are condensed thereon assuring continued effective operation of the liquid nitrogen trap.

The present invention provides an improved construction for use with thermal gradient members existing in cryogenically cooled apparatus. The device readily handles gases which may be emitted from intermediate temperature surfaces in low pressure areas, condensing the evaporating or other gas molecules so that their pressure effects are not sensed in the associated apparatus.

While I have described preferred embodiments of my invention, it will be understood that the invention is not limited thereto since it may be otherwise embodied within the scope of the appended claims.

What I claim as new and desire to secure by Letters Patent of the United States is:

1. In a vacuum system, the combination of first wall means maintained at substantially ambient temperature, second wall means maintained at substantially cryogenic temperatures, wall means for connecting the first and second wall means, said first, second, and connecting wall means defining an evacuated space, said connecting wall means having a temperature gradient between the temperatures of the first and second wall means, a projecting member thermally connected to said second wall means and maintained substantially at the temperature of the second wall means, said projecting member having portions substantially uniformly spaced from portions of the connecting wall means to condense molecules emitted from the connecting wall and means, said projecting member being located in said evacuated space.

2. In a vacuum system, the combination of first wall means maintained at substantially ambient temperatures, second wall means maintained at cryogenic temperatures, wall means for connecting the first and second wall means, means for maintaining evacuated conditions on one side of said wall means, said connecting wall means having a temperature gradient between the temperatures of the first and second wall means, a projecting member thermally connected to said second wall means on the evacuated side of said second wall means and substantially maintained at the temperature of the second wall means, said projecting member having portions substantially uniformly spaced from portions of the connecting wall means to condense molecules emitted from the connecting wall means.

3. In a cryogenic device, the combination of means defining an evacuated chamber, said means including a wall maintained substantially at ambient temperature, a refrigerated wall, a thermal gradient barrier connecting said ambient temperature wall and said refrigerated wall, a projecting member extending into said evacuated chamber and being thermally connected to said refrigerated wall and having substantially the temperature of the refrigerated wall, said projecting member having portions extending adjacent to and spaced from portions of said thermal gradient barrier to substantially condense molecules adjacent said thermal gradient barrier.

4. In a cryogenic apparatus, the combination of means defining an evacuated chamber including a wall maintained at substantially ambient temperature conditions, said wall having means defining an opening therein, a member adapted to conduct a refrigerant and extending through said opening in said wall, a thermal gradient member connecting said wall and said refrigerated member, a projecting member thermally connected to said refrigerated member and extending into said evacuated chamber, said projecting member being uniformly spaced from said thermal gradient member and being adapted to condense molecules adjacent the thermal gradient member, and to shield said thermal gradient member from said evacuated chamber.

5. In a cryogenic apparatus, the combination of means defining an evacuated chamber including a wall having an opening therein, said wall being maintained at substantially ambient temperature conditions, a pipe member for a cryogenic refrigerant extending through said opening in said wall, a thermal gradient barrier having a substantially cylindrical shape being connected to the peripheral portions of said opening and being connected to said pipe member, a projecting member having a substantially cylindrical shape at least partially enveloping said thermal gradient member and extending into said evacuated chamber whereby molecules emitted from said thermal gradient member are condensed on said projecting member.

6. In a vacuum system, first wall means adapted to be maintained at a substantially ambient temperature, second wall means adapted to be maintained at a substantially cryogenic temperature, connecting wall means between the first and second wall means, said first, second, and connecting wall means defining a space; the improvements comprising a projecting member connected to the second wall means and adapted to be maintained at substantially the same temperature as the second wall means, said projecting member being substantially uniformly spaced from the connecting wall means and substantially shielding said connecting wall means from said space.

7. In a vacuum system having means forming an evacuated chamber, said means adapted to be maintained at an ambient temperature, a diffusion pump for reducing the pressure within the chamber, trap means adapted to be cooled to a cryogenic temperature for the purpose of denying access of diffusion pump fluid to the chamber and for cryogenically pumping condensable gases within the chamber, and a thermal gradient barrier connected between the trap means and the means forming the chamber for mounting the trap means in said chamber, said thermal gradient barrier preventing access to the chamber except through the trap means, the improvement comprising a baffle member connected to the trap means and adapted to be maintained at substantially the same temperature as the trap means, said baffle member being substantially uniformly spaced from the thermal gradient barrier to condense gas molecules emitted from the chamber side of the thermal gradient barrier.

8. In combination means for forming a chamber, said means adapted to be maintained at an ambient temperature, a diffusion pump in communication with the chamber for reducing the pressure within the chamber, trap means adapted to be cooled to a cryogenic temperature for the purpose of denying access of diffusion pump fluid to the chamber and for cryogenically pumping condensable gases within the chamber, a thermal gradient barrier connected between the trap means and the means forming the chamber for mounting the trap means in the chamber and for preventing access to the chamber except through the trap means, and a baffle member connected to the trap means and adapted to be maintained at substantially the same temperature as the trap means, said baffle member being substantially uniformly spaced from the thermal gradient barrier and substantially shielding said barrier from gas molecules in said chamber.

References Cited in the file of this patent

UNITED STATES PATENTS

| | | |
|---|---|---|
| 2,317,814 | Schuchmann | Apr. 27, 1943 |
| 2,465,229 | Hipple | Mar. 22, 1949 |
| 2,465,793 | De Groat | Mar. 29, 1949 |
| 2,513,114 | Smith | June 27, 1950 |
| 2,565,722 | Dawley | Aug. 28, 1951 |
| 2,831,549 | Alpert | Apr. 22, 1958 |
| 2,949,015 | Fite | Aug. 16, 1960 |